Jan. 4, 1938.    G. P. MARSDEN    2,104,265
CLUTCH MECHANISM
Filed Dec. 24, 1934
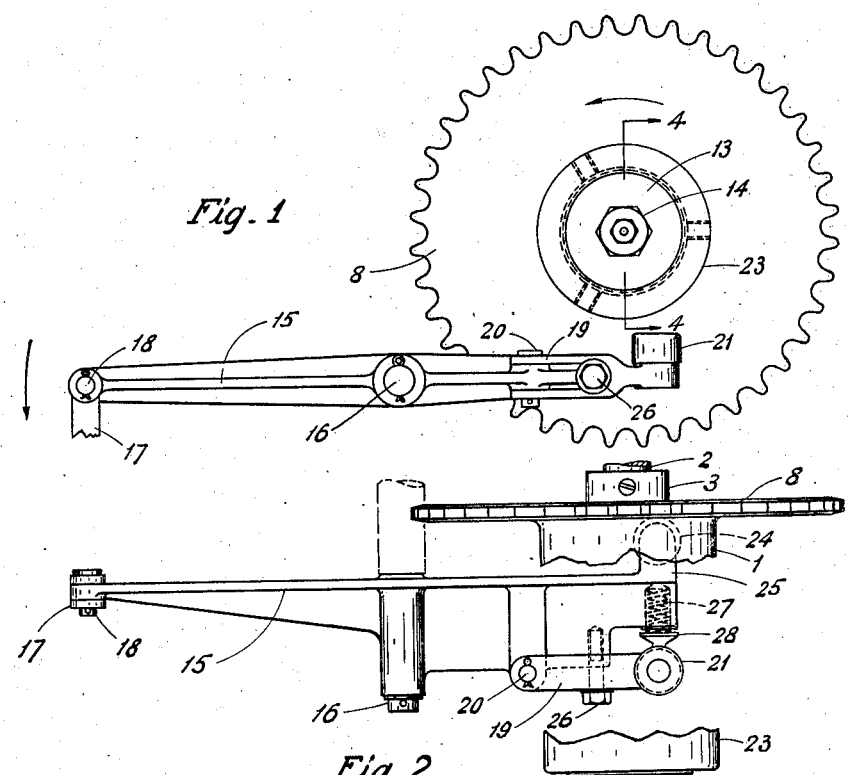
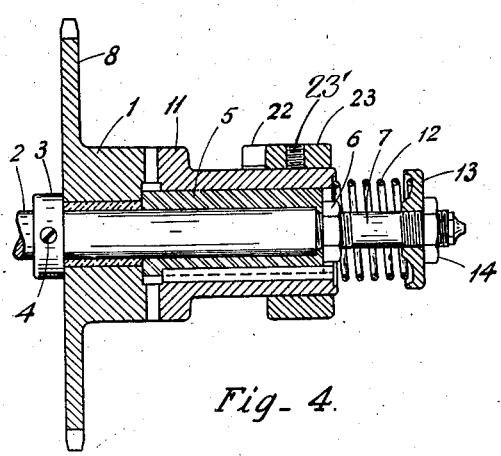
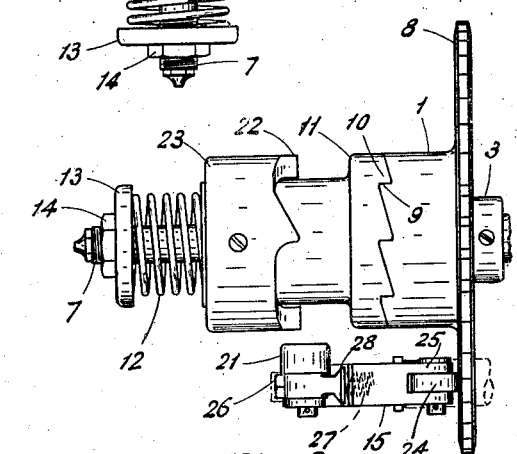
INVENTOR.
George. P. Marsden.
BY Philip A. Minnis
ATTORNEY.

Patented Jan. 4, 1938

2,104,265

UNITED STATES PATENT OFFICE 2,104,265

CLUTCH MECHANISM

George P. Marsden, San Jose, Calif., assignor to Food Machinery Corporation, San Jose, Calif., a corporation of Delaware Application December 24, 1934, Serial No. 759,073

7 Claims. (Cl. 192—24)

This invention relates to clutch mechanisms, and is more particularly concerned with the provision of certain new and useful improvements in clutch mechanisms of the inter-engaging cam actuated type.

It is a well known characteristic of clutch mechanisms of this type that in opening the clutch the actuating mechanism frequently operates to just barely disengage the clutch members without effecting sufficient clearance between them to avoid a partial interference between their driving teeth, with the result that the clutch is very noisy when open and the driving teeth or their corners are likely to be broken off.

It is a primary object of this invention to overcome such objectionable features of operation by the provision of a clutch mechanism embodying actuating mechanism for the clutch members which is operable to effect a positive clearance of the clutch members upon disengagement thereof.

With such objects in view, as well as others which will hereinafter become more apparent, the invention will best be understood from the following detailed description of one form of practical embodiment, taken in connection with the accompanying drawing, wherein:

Figure 1 is a side elevation of a clutch mechanism embodying the principles of the invention.

Figure 2 is a plan view of the mechanism illustrated in Figure 1 with a portion thereof broken away to better illustrate certain details of construction.

Figure 3 is an end view of the apparatus shown in Figure 1 as viewed from the right thereof.

Figure 4 is a sectional view taken along the line 4—4 of Figure 1.

As illustrated in the drawing, the clutch mechanism includes a driving clutch member 1 rotatably mounted on a power take-off shaft 2 and held against axial movement thereon by a collar 3 secured to the shaft by a set screw 4 and a sleeve 5 keyed to the shaft and held in position thereon by a nut 6 carried on a reduced portion 7 of the shaft. A gear or sprocket 8 may be formed integral with the clutch member 1 for the application of power thereto from any suitable source.

The driving clutch member 1 is provided with a plurality of jaw teeth 9 inter-engageable with the complementary jaw teeth 10 of a driven clutch member 11 which is slidably keyed to the sleeve 5, and the clutch members are normally held in engagement by means of a spring 12 which bears at one end against the driven clutch member 11 and at its other end against a cap washer 13 secured on the reduced portion 7 of the shaft 2 by a nut 14.

For disengaging the clutch members a clutch lever 15 is provided which may be pivotally mounted on a shaft 16 secured to any stationary support adjacent the clutch mechanism, and may be operated in any suitable manner as by means of a rod 17 secured to the lever at 18.

The clutch actuating lever, as best seen in Figures 1, 2 and 3, carries a bifurcated arm 19 which is pivotally secured to the web of the lever at 20 and carries a follower roller 21 journalled on its upper face in position to be carried by the lever into and out of the path of the inclined lobes 22 of a cam 23 which is adjustably secured to the driven clutch member 11 by means of a set screw 23' as illustrated.

A roller 24 is journalled in a bifurcated lug 25 formed integral with the lever 15 and bears against the face of the gear or sprocket 8 and serves to brace the clutch lever against the force exerted by engagement of the roller 21 with the cam lobes 22 in disengaging the clutch. The arm 19 is normally urged outwardly from the lever 15 toward the cam 23 to the extent permitted by a stop 26 by means of a concealed spring 27 seated in a recess in the web of the lever and bearing against a boss 28 projecting from the end of the arm to one side of the roller 21.

By this construction, when the clutch lever is shifted by downward movement of the rod 17 to carry the roller 21 into the path of the cam lobes 22, the roller 21 is depressed by the cam against the tension of the spring 27 until the boss 28 strikes the web of the clutch lever, or until the spring overcomes the frictional resistance of the clutch members against separation, whereupon the clutch member 11 is caused to slide axially out of engagement with the clutch member 1. The spring 27 is, however, stronger than the clutch spring 12 so that as soon as the clutch jaws are disengaged the spring 27 overcomes the clutch spring 12 and continues to force the slidable clutch member away from the clutch member 1 to the limit permitted by the stop 26. Thus the expansion of the spring 27 effects a positive clearance between the clutch jaws when the clutch members are disengaged, thereby precluding any interference between the relatively rotating jaws of the clutch members while the latter are disengaged.

It is believed that the construction and operation of apparatus embodying my invention will now be apparent, and what I claim as new and desire to protect by Letters Patent is:

1. In a clutch mechanism, the combination of a pair of rotary inter-engageable driving and driven clutch members, a clutch spring normally holding said clutch members in driving engagement, a cam carried by one of said clutch members, a clutch lever, a cam follower mounted on said clutch lever for movement thereby into and out of the path of said cam and co-operable with said cam to separate and disengage said clutch members, and a spring carried by said clutch lever and associated with said cam follower to exert a thrust against the latter in a direction longitudinally of the clutch axis, said spring being compressible by engagement of said cam and follower and operable to expand in opposition to said clutch spring upon disengagement of said clutch members whereby to effect a positive clearance therebetween.

2. In a clutch mechanism, the combination of a pair of rotary inter-engageable driving and driven clutch members, a clutch spring normally holding said clutch members in driving engagement, a clutch lever, an anti-friction thrust bearing carried by said clutch lever for bearing engagement with one of said clutch members to brace said lever, a cam carried by the other clutch member, a cam follower mounted on said clutch lever for movement thereby into and out of the path of said cam and co-operable with said cam to separate and disengage said clutch members, and a spring associated with said cam follower for compression by engagement of said cam and follower and operable to expand in opposition to said clutch spring upon disengagement of said clutch members whereby to effect a positive clearance therebetween.

3. In a clutch mechanism, the combination of a pair of rotary inter-engageable driving and driven clutch members, a clutch spring normally holding said clutch members in driving engagement, a cam carried by one of said clutch members, a clutch lever, an arm pivotally secured to said lever, a follower roller mounted on said arm for movement thereby into and out of the path of said cam and co-operable with said cam to separate and disengage said clutch members, and a spring associated with said arm for yieldingly urging said follower roller toward said cam, said spring being mounted for compression by engagement of said cam and follower and operable to expand in opposition to said clutch spring upon disengagement of said clutch members whereby to effect a positive clearance therebetween.

4. In a clutch mechanism, the combination of a pair of rotary clutch elements, one of which is movable into and out of driving engagement with the other, a clutch spring normally holding said clutch elements in driving engagement, a clutch actuating mechanism including a depressible member for operative engagement with said movable clutch element to open the clutch, and a spring associated with said depressible member to exert a thrust against the latter in a direction longitudinally of the clutch axis, said spring being compressible by operative engagement of said depressible member with the movable clutch element, and operable to expand in opposition to said clutch spring upon disengagement of the clutch elements to effect a positive clearance therebetween, said spring and said depressible member being mounted for bodily movement as a unit into and out of operative relation with respect to said movable clutch element.

5. In a clutch mechanism, the combination of a pair of rotary inter-engageable driving and driven clutch members, a clutch lever, an anti-friction thrust bearing carried by said clutch lever for continuous bearing engagement with one of said clutch members, a cam carried by the other clutch member, and a cam follower mounted on said clutch lever for movement thereby into and out of engagement with the cam and co-operable with said cam to separate and disengage said clutch members.

6. In a clutch mechanism, the combination of a pair of rotary clutch elements mounted for relative axial movement to determine engagement and disengagement thereof, resilient means urging said clutch elements into engagement, and expansible means having relative movement axially of said clutch elements for exerting a separating thrust axially of said elements and mounted for bodily movement into operative position between said clutch elements.

7. In a clutch mechanism, the combination of a pair of rotary clutch elements mounted for relative axial movement to determine engagement and disengagement thereof, resilient means urging said clutch elements into engagement, a clutch control member mounted for movement at substantially a right angle to the clutch axis, a pair of friction elements mounted on said control member for engagement with said respective clutch elements and for relative movement axially of said clutch, and spring means compressed between said friction elements to exert a separating thrust therethrough on said clutch elements upon movement of said control member to position said friction elements and said spring means in operative position between said clutch elements.

GEORGE P. MARSDEN.